United States Patent [19]
Klees

[11] Patent Number: 5,999,395
[45] Date of Patent: *Dec. 7, 1999

[54] MONITORING CIRCUIT FOR A CONSTANT MONITORING OF A PLURALITY OF SIGNAL INPUTS

[75] Inventor: Christoph Klees, Wiehl, Germany

[73] Assignee: Schneider Electric SA, Boulogne Billancourt, France

[*] Notice: This patent issued on a continued prosecution application filed under 37 CFR 1.53(d), and is subject to the twenty year patent term provisions of 35 U.S.C. 154(a)(2).

[21] Appl. No.: 09/058,136

[22] Filed: Apr. 10, 1998

[30] Foreign Application Priority Data

Apr. 11, 1997 [DE] Germany .............................. 197 15 098

[51] Int. Cl.$^6$ ...................................................... H01H 47/32
[52] U.S. Cl. ........................... 361/166; 361/170; 307/326
[58] Field of Search ..................................... 361/156, 170, 361/189, 190, 191, 193; 307/326, 328; 192/129 R

[56] References Cited

U.S. PATENT DOCUMENTS

| | | | |
|---|---|---|---|
| 3,766,441 | 10/1973 | Gray | 361/170 |
| 4,034,235 | 7/1977 | Wade | 307/117 |
| 4,054,935 | 10/1977 | Ginsberg | 361/189 |
| 4,257,082 | 3/1981 | Brown | 361/191 |
| 5,543,997 | 8/1996 | Ruprecht | 361/93 |
| 5,559,664 | 9/1996 | Dogul et al. | 361/191 |
| 5,771,146 | 6/1998 | Schlicker et al. | 361/166 |

*Primary Examiner*—Jeffrey Gaffin
*Assistant Examiner*—Kim Huynh
*Attorney, Agent, or Firm*—Oblon, Spivak, McClelland, Maier & Neustadt, P.C.

[57] ABSTRACT

A monitoring circuit which allows for the complete monitoring, at short intervals, of several signal inputs and consequently of signal outputs without having to take into account external interference, like for instance the execution time in the case of light barriers, is obtained in that the signal inputs are connected through two capacitors to at least one relay, in that the signal inputs apply a potential to the capacitors while oscillating and in that the capacitors discharge into the relays while oscillating.

3 Claims, 3 Drawing Sheets

MONITORING CIRCUIT FOR A CONSTANT MONITORING OF A PLURALITY OF SIGNAL INPUTS

BACKGROUND OF THE INVENTION

1. Field of the Invention

This invention relates to a monitoring circuit for constant monitoring of several signal inputs, at least two, particularly four.

2. Discussion of Background

This type of monitoring circuit is known from the state of the art. For example, they are used for monitoring reflective light barriers and polarisation filters. For this purpose, at least two sensors are tested cyclically at a frequency of for example 300 Hz. If during this test procedure, an obstacle is detected in one of the two beam paths, or an interference at one of the two redundant chains of the electronics or at one of the two sensors, two safety relays drop, which switch off a dangerous machine connected thereto. The whole system can be monitored via an external test input, the monitoring also including the relays. After a disruption of the protective field, i.e. after the machine has been switched off, switching on again is only possible through a manual release. A disadvantage of the above described monitoring circuit is that the relays used operate relative slowly due to their mechanical components, so that only specific monitoring frequencies can be reached. Moreover, the relays are basically subject to wear, i.e. burn out or the like can cause circuit modifications.

SUMMARY OF THE INVENTION

Starting from the state of the art, the invention is based on the objective to provide a generic monitoring circuit allowing for complete monitoring in short intervals of several signal inputs and consequently of signal outputs without having to take into account external interference, like for instance execution time in the case of light barriers.

The solution of this objective provides for the signal inputs to be connected through two capacitors to at least one relay, for the signal inputs to apply a potential to the capacitors while oscillating, and for the capacitors to discharge into the relays while oscillating.

In this respect, it is provided for a relay discharge current from one of the two capacitors to be applied to the oscillating relays. If the discharge current fails to appear, the relay drops shutting down the machine linked to the monitoring circuit. The application of this type of monitoring circuit is found especially in safe practice, i.e. on machines that must be protected from operator access during operation. E.g., this type of monitoring circuits is used in conjunction with light barriers for presses, lathes or other dangerous machines in operating mode.

According to another feature of the invention, the signal inputs are provided for being connected to an optoelectric signal output. The optical signal produced by a transmitter is converted into an electrical signal inside a receiver that is connected to the signal input. The receiver can be designed as a reflector if the transmitter of the optical signal also is the receiver. Therefore, the signals picked up from the signal inputs are checked automatically. If variations are determined here, this results in the connected machine to be switched off. The monitoring circuit thus allows for automatic monitoring with the signals between the signal inputs and the relays being rectified.

According to another feature of the invention, the potential outputs of the signal inputs are provided to be connected to transistors that are directly controlled by the potentials of the signal inputs. These transistors control the charge of the two capacitors that are maintained charged or discharged while oscillating so that the relays constantly receive a current pulse.

Finally, it is provided according to another feature for at least two signal inputs to be connected in parallel. The advantage of this parallel connection of the signal inputs is due to the fact that the sensors can be controlled in parallel so that it is possible to ignore external interference, like for example dependence on execution time of light sources.

With the monitoring circuit according to the invention, it is possible to combine one-way light barriers that can be monitored permanently by means of their test contact. Light barriers are preferably staggered with respect to their transmitter and their receiver to avoid mutual interference. It is possible to connect a number of light barriers corresponding to the number of signal inputs, the light barriers being configured via external wire straps.

Other features and advantages of the invention will become apparent from the following description of the accompanying drawing which shows a preferred embodiment of a monitoring circuit.

DETAILED DESCRIPTION OF THE PREFERRED EMBODIMENT

Figure 1:
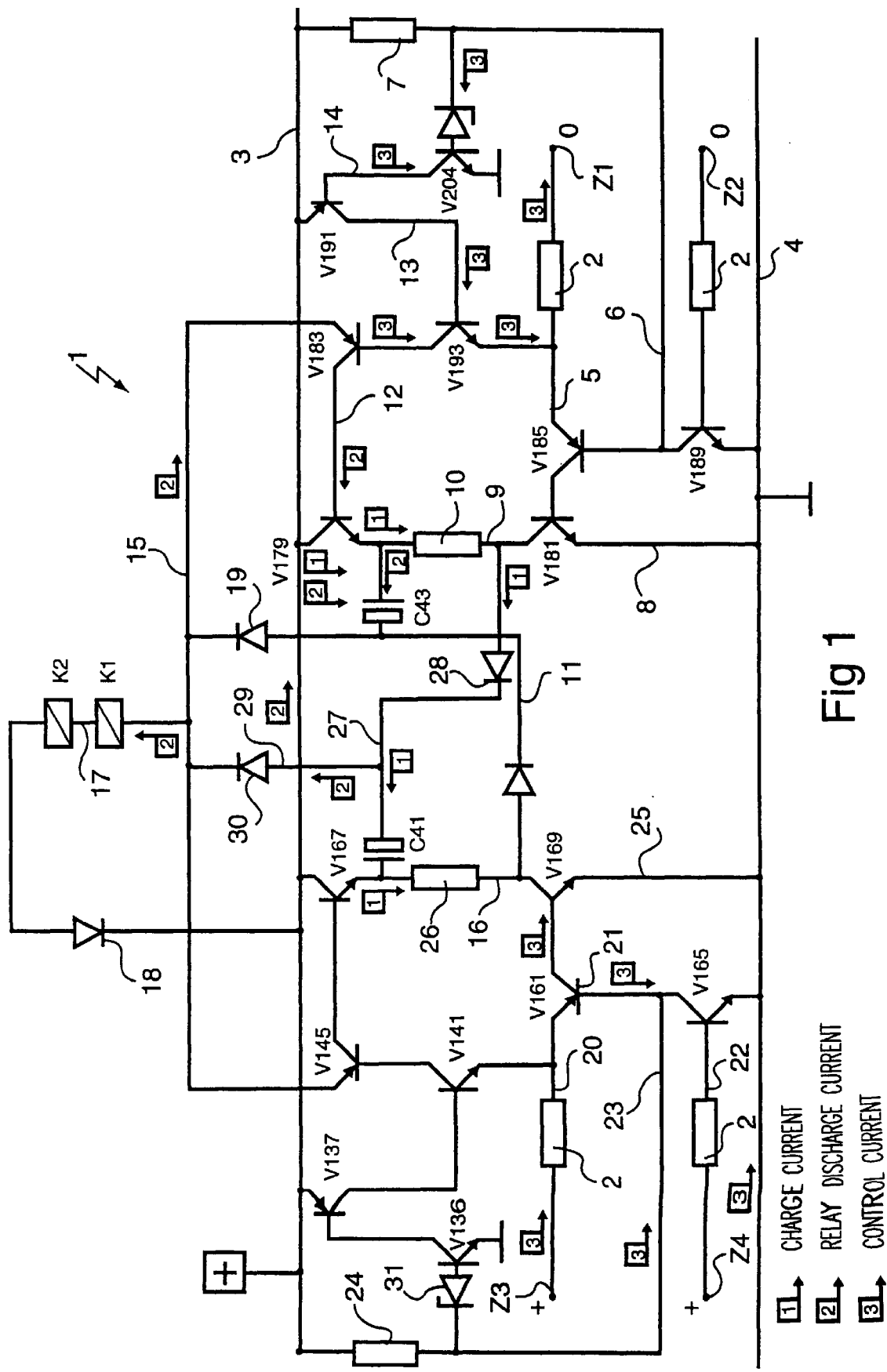
FIG. 1 shows a schematic representation of a monitoring circuit with current flows during a first phase.
Figure 2:
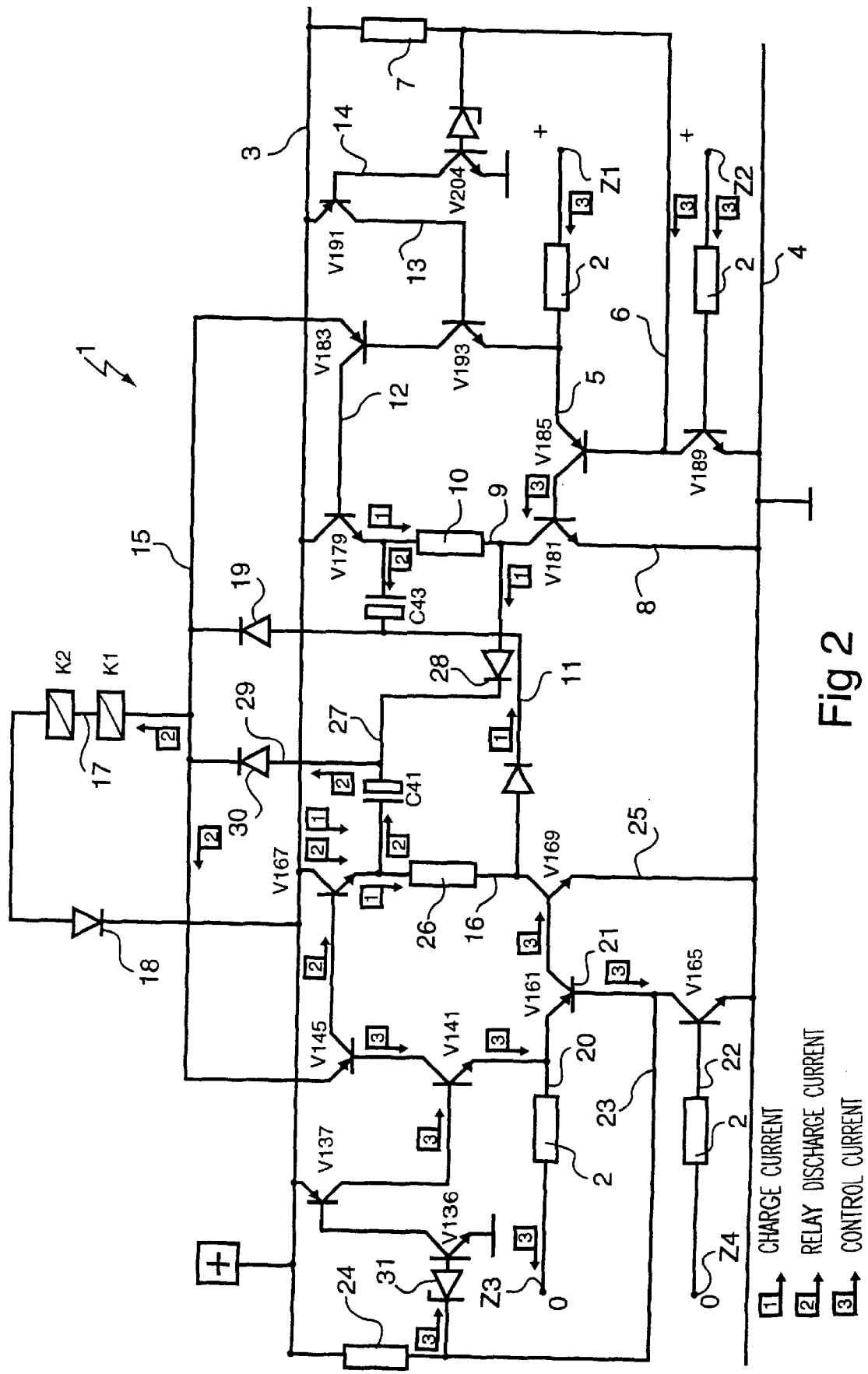
FIG. 2 shows the monitoring circuit of FIG. 2 during a second phase.

FIGS. 1 and 2 show a monitoring circuit 1. The monitoring circuit 1 has four signal inputs Z1, Z2, Z3 and Z4. Each signal input Z1, Z2, Z3 and Z4 is connected to a resistor 2.

Furthermore, FIGS. 1 and 2 show a positive power lead 3 and a negative power lead 4.

The signal input Z1 is connected to a transistor V185 via a lead 5 on the emitter side. The base of the transistor is connected on the one side via a lead 6 to the positive power lead, with a resistor 7 being inserted, and on the other side to the collector of a transistor V189, said transistor V189 being connected on the emitter side to the negative power lead 4 and its base is connected to the signal input Z2, a resistor 2 being inserted.

The transistor V185 is adjacent with its collector to the base of a transistor V181 that is connected on the emitter side via a lead 8 with the negative power lead 4 and on the collector side to a lead 9. In the lead 9, a resistor 10 is connected, a capacitor C43 being connected in parallel with it, wherein the capacitor is designed as a polarised electrolyte capacitor whose negative plate is connected to the lead 9 and whose positive plate is connected to a lead 11. Moreover, in the lead 9, a transistor V179 is connected with its emitter that is connected on its collector side to the positive power lead 3.

The base of the transistor V179 is linked to the collector of a transistor V183 via a lead 12. The transistor V183 in turn is connected with its base to a collector of a transistor V193 whose emitter is connected to the lead 5 and whose base is connected via a lead 13 to the collector of a transistor V191. The transistor V191 is connected on the emitter side to the negative power lead 4 and on the base side via a lead 14 to the collector of a transistor V204. The base of this transistor V204 is linked to the lead 6 through a Zener diode.

The transistors V189, V181, V193 and V204 are designed as NPN-transistors, whereas the transistors V191, V183 and V185 are designed as PNP-transistors.

The lead 11 links a lead 15 to a lead 16 to be described later.

The lead 15 is connected on the emitter side to the transistor V183 and to a transistor V154. Furthermore, to the lead 15, a lead 17 is connected into which the two relays K1 and K2 are series-connected, and which on the other side is connected to the positive power lead 3. A diode 18 is connected in the lead 17. Another diode 19 is connected in the lead 11.

The above described right side of the monitoring circuit 1 corresponding exists as a left side of the monitoring circuit 1 for the signal inputs Z3 and Z4. The signal input Z3 is connected on the emitter side via a lead 20, into which the resistor 2 is inserted, to a transistor V161, said transistor V161 being linked via a lead 21 to the collector of a transistor V165. At the base of the transistor V165, a lead 22 is connected that links the base of the transistor V165 to the signal input Z4. On the emitter side, the transistor V165 is connected to the negative power lead 4.

Between the base of the transistor V161 and the collector of the transistor V165, at the lead 21, a lead 23 is connected, that is linked to the positive power lead 3 and into which a resistor 24 is inserted.

The collector of the transistor V161 is linked to the base of a collector V169 that is connected on the emitter side via a lead 25 to the negative power lead 4 and with its collector series-connected with a resistor 26 and a capacitor C41. The capacitor C41 is again designed as a polarised electrolyte capacitor whose positive plate is linked through a lead 27 to the lead 9, wherein a diode 28 is arranged in the lead 27. The lead 27 is furthermore connected via a lead 29 with an inserted diode 30 to the lead 15.

Between the capacitor C41 and the resistor 26, the emitter of a transistor V167 is connected, whose collector is linked to the positive power lead and whose base is linked to the emitter of the above mentioned transistor V145. The transistor V145 is—as mentioned above—connected to the lead 15 on the emitter side. The base of the transistor V145 is adjacent to the collector of a transistor V141 that is linked to the lead 20 on the emitter side. The base of the transistor V141 is linked to the collector of a transistor V137 which in turn is linked to the positive power lead 3 through its emitter. The base of the transistor V137 is connected to the collector of a transistor V136 whose base is connected to the lead 23 with a Zener diode 31 being inserted, wherein the resistor 24 is series-connected with the diode 31.

FIG. 1 shows the charge current, the relay discharge current and the control current in the monitoring circuit during a first phase. Here, the charge current is indicated by an arrow with the number 1, the relay discharge current by an arrow with the number 2 and the control current by an arrow with the number 3. During this first phase, a positive potential appears at the signal inputs Z3 and Z4 and an earth potential appears at the signal inputs Z1 and Z2. The capacitor C43 is charged and the capacitor C41 is discharged.

Through the potentials appearing at the signal inputs Z3 and Z4, the transistors V161, V165 and V169 are controlled directly. The corresponding charge currents are indicated in the leads 20, 21 and 22.

Through the earth potentials of the signal inputs Z1 and Z2, the transistor V204 is a conductor. Through this transistor V204 flows the base current of the transistor V191 whose collector current in turn controls the base of the transistor V193. The transistor V193 can only conduct if the potential at the signal input Z1 is an earth potential. In this case, the base current of the transistor V183, which is supplied from the capacitor C43, flows through the transistor V193. The base current of the transistor V179 flows along the collector-emitter path of the transistor V183.

In this state, the transistors V169 and V179 are fully controlled so that the capacitor C43 discharges into relays K1 and K2. The discharge occurs via the transistor V179, whereby the discharge also delivers the base current for the transistors V179 and V183.

At the same time as the discharge of the capacitor C43, the capacitor C41 is charged through the transistors V179 and V169. The charge of the capacitor C41 is performed through the potential at the signal inputs Z3 and Z4.

During the second phase shown in FIG. 2, which alternates every 2.3 ms with the first phase shown in FIG. 1, the transistors V181, V185 and V189 are directly controlled because now the signal inputs Z1 and Z2 have a potential and the signal inputs Z3 and Z4 have an earth potential. Due to the earth potentials in the signal inputs Z3 and Z4, the transistor V136 is a conductor. Through this transistor flows the base current of the transistor V137 whose collector current in turn controls the base of transistor V141. However, the transistor V141 can only conduct if the potential at the signal input Z3 is an earth potential.

Through the transistor V141 flows the base current of the transistor V145 which is supplied from the capacitor C41. The base current for the transistor V167 flows along the collector-emitter path of the transistor V145.

During this phase, the transistors V167 and V181 are fully controlled. Thereby, the capacitor C41 discharges into the relays K1 and K2 through the transistor V167. Moreover, the capacitor C41 delivers the base current for the transistors V167 and V145. At the same time as the discharge of the capacitor C41, the capacitor C43 is recharged through the transistors V167 and V181.

The phases described above repeat approximately every 2.3 ms so that a constant monitoring of the signal inputs Z1, Z2, Z3 and Z4 takes place. In case a potential does not have the appropriate capacity and/or polarity during the monitoring, the recharge of one capacitor does not take place so that this capacitor then cannot discharge into the relays K1 and K2. Consequently, the relays K1 and K2 drop, so that the dangerous machine connected thereto is immediately switched off. In case of a component failure, the transistors V167, V169, V179 and/or V181 burn out so that the whole control breaks down and also prevents the recharge of a capacitor with the result that during the subsequent phase, a discharge of this capacitor into the relays K1 and K2 cannot take place.

Figure 3:
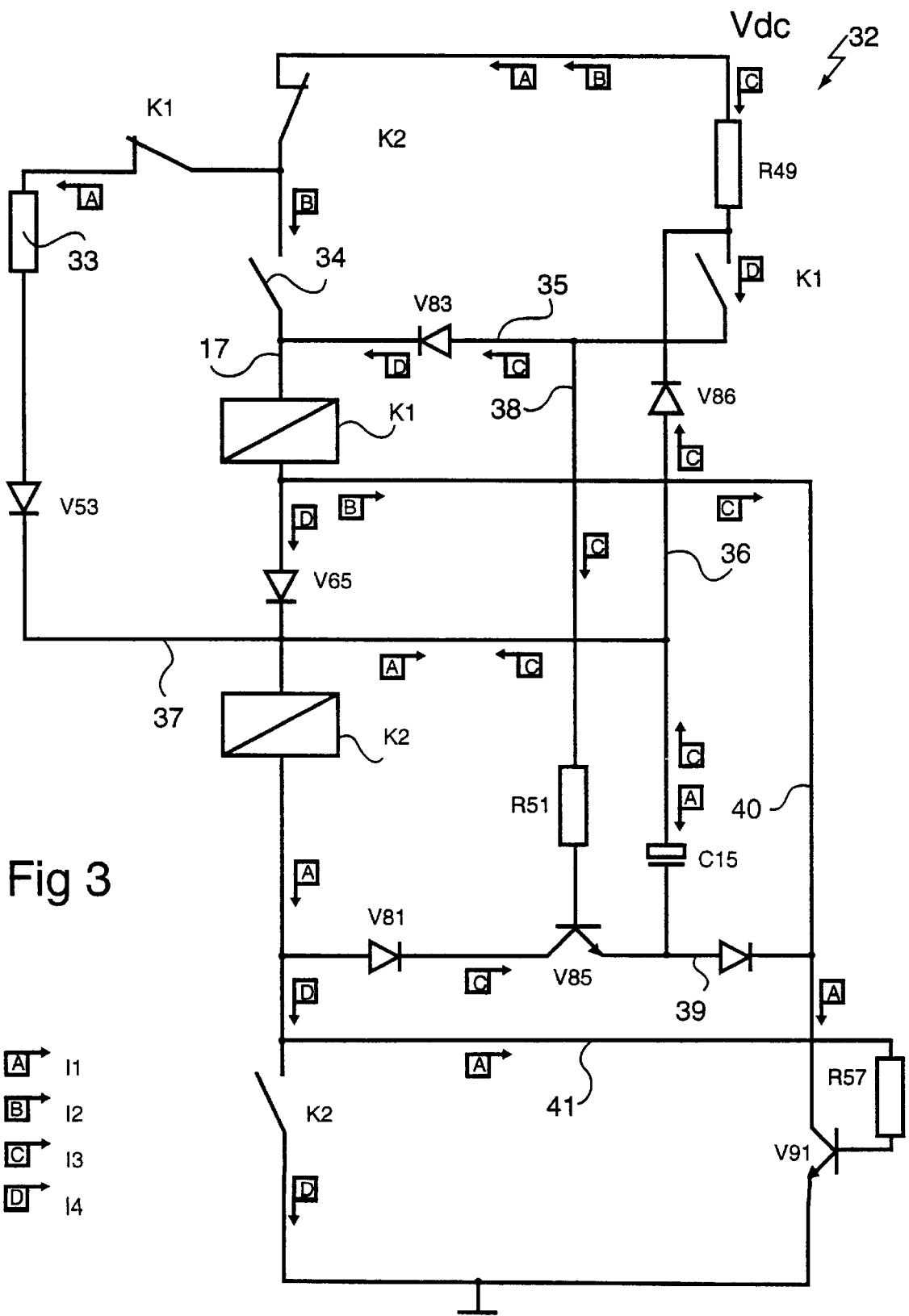
FIG. 3 shows a circuit connected to the monitoring circuit of FIGS. 1 and 2 consisting of two relays for start-up of an external machine.

For initially activating the monitoring circuit 1 shown in FIGS. 1 and 2 and described above, a start-up procedure is required which is performed via a circuit 32, as shown in FIG. 3.

FIG. 3 shows the lead 17 with the relays K1 and K2 being connected. The relays K1 and K2 are series-connected, with a diode V65 being inserted. In parallel with relay K1, a resistor 33 and a diode V53 are connected. A closing contact of relay K1 is series-connected with the resistor 33. On the other hand, the closing contact of relay K2 is series-connected with a switch 34 for the external start-up. The opening contact of relay K2 is inserted in the lead 17 whereas the opening contact of relay K1 is placed into a lead 35 connected to the lead 17, lead 35 being linked through a resistor R49 to the closing contact of relay K2. Moreover, in the lead 35, a diode V83 is arranged, the opening contact being arranged between the resistor R49 and the diode V83. A diode V86 and a capacitor C15 are connected into a lead 36 connected between resistor R49 and the opening contact of relay K1. Between the capacitor C15 and the diode V86, at the lead 36, a lead 37 is connected which is linked on the one side to the lead 17 and on the other side to the resistor 33.

In parallel with the lead 36, a lead 38 is arranged, which links the lead 35 to a transistor V85, the lead 38 being connected to the base of the transistor V85. On the collector side, the transistor V85 is connected to the lead 17 between the relay K2 and the opening contact of the relay K2, whereas the emitter of the transistor V85 is connected to a lead 39, to which lead 36 with the capacitor C15 is also connected. Furthermore, the lead 39 is linked through a lead 40 to the lead 17 between the two relays K1 and K2.

In parallel with the lead 39, a lead 41 is arranged into which a resistor R57 is connected. The lead 41 links the lead 17 to the base of a transistor V91 that is connected to the lead 40 on the collector side.

The external start-up comprises four phases that must necessarily take place sequentially. FIG. 3 illustrates the four phases by means of the currents $i_1$, $i_2$, $i_3$ and $i_4$, wherein an arrow with a capital letter from A to D is assigned to the currents $i_n$ respectively.

During the first phase, the capacitor C15 is charged via the two opening contacts of the relays K1 and K2. The base current of the transistor V91 then flows through the relay K2. Capacitor C15 must be charged to fully control the relay K2. During the second phase, the switch 34 is activated so that voltage is supplied to relay K1. The current then flows through the relay K1 and the transistor V91. This phase represents the start-up command.

When the relay K1 has reached a self-maintaining state subsequently to the start-up command, the current flows through the resistor R49, the relay K1 and the transistor V91. The closing contact of relay K1 then controls the base of the transistor V85. This discharges the capacitor C15 via the relay K2. The capacitor C15 also supplies the transistor V85 with additional base current. During this third phase, the relay K1 is in self-maintaining state.

During the fourth and last phase, the relay K2 pulls up. As soon as the relay K2 has pulled up, the transistor V91 is locked and the locking current flows through the two closing contacts of the relays K1 and K2.

Thereby, in this start-up circuit 32, the relays K1 and K2 are not started simultaneously but sequentially. In comparison with the state of the art, this type of start-up is cheaper, more efficient and provides for complete monitoring of both the start circuit 32 and the machine series-connected thereto.

I claim:

1. A monitoring circuit for constant monitoring of at least one pair of signal inputs wherein a first one signal input of each of said at least one pair have a first value and wherein a second one of each of said at least one pair has a second value wherein said second value and said first value alternately interchange with each other at a fixed frequency, said monitoring circuit comprising:

at least one pair of capacitors connected respectively to one of said at least one pair of signal inputs;

at least two relays connected to one pair of said at least one pair of capacitors whereby each of said one of said pair of signal inputs provides a potential to a corresponding one of said at least one pair of capacitors during said alternation of said first and second values at said fixed frequency and wherein each of said capacitors alternatively discharge into said relays at a discharge frequency equal to said fixed frequency.

2. The monitoring circuit according to claim 1, wherein each of said signal inputs are connected to a respective transistor.

3. The monitoring circuit according to claim 1, wherein said at least one pair of signal inputs includes at least two pair of signal inputs and wherein at least two inputs of said at least two pair are connected in parallel.

* * * * *